United States Patent
Babin

(10) Patent No.: US 6,361,051 B1
(45) Date of Patent: Mar. 26, 2002

(54) FACE SEAL FOR BARREL TYPE WATER VALVE

(75) Inventor: Christopher J. Babin, Rochester Hills, MI (US)

(73) Assignee: Eaton Coporation, Cleveland, OH (US)

( * ) Notice: Subject to any disclaimer, the term of this patent is extended or adjusted under 35 U.S.C. 154(b) by 0 days.

(21) Appl. No.: 09/435,978

(22) Filed: Nov. 8, 1999

(51) Int. Cl.⁷ ............................ F16J 15/16; F16K 11/02
(52) U.S. Cl. .................. 277/607; 277/616; 277/627; 137/625.41; 137/625.46; 251/317; 251/361; 251/363
(58) Field of Search ................. 277/607, 616, 277/626, 627; 137/454.2, 625.41, 625.46; 251/214, 306, 315.07, 317, 172, 316, 175, 361, 363, 368, 314

(56) References Cited

U.S. PATENT DOCUMENTS

| | | | |
|---|---|---|---|
| 2,310,583 A | | 2/1943 | Johnson ...................... 251/103 |
| 3,552,716 A | * | 1/1971 | Hoos |
| 3,698,687 A | | 10/1972 | Kitamura .................... 251/315 |
| 3,726,314 A | * | 4/1973 | Moen |
| 3,840,048 A | * | 10/1974 | Moen |
| 3,916,950 A | | 11/1975 | Mongerson et al. ... 137/625.41 |
| 4,266,754 A | * | 5/1981 | Ninomiya et al. |
| 4,305,419 A | * | 12/1981 | Moen |
| 4,469,121 A | * | 9/1984 | Moen |
| 4,478,388 A | * | 10/1984 | George |
| 4,494,730 A | * | 1/1985 | George |
| 4,628,962 A | * | 12/1986 | Pezzarossi |
| 4,815,704 A | | 3/1989 | Berchem ..................... 251/315 |
| 4,881,570 A | * | 11/1989 | Ziebach et al. |
| 4,883,253 A | | 11/1989 | Hashimoto et al. ......... 251/315 |
| 5,901,964 A | * | 5/1999 | Williams et al. |

* cited by examiner

Primary Examiner—Anthony Knight
Assistant Examiner—John L. Beres
(74) Attorney, Agent, or Firm—Roger A. Johnston

(57) ABSTRACT

A cylindrically curved rectangular face seal is provided for a cross-ported barrel type rotary valve member. The seal has a central flow orifice therethrough with an annular raised rib formed about the orifice and extending in a radial direction from the concave inner face of the seal. The opposite edges of the seal extending in an axial direction each have a notch or rib thereon for axial sliding engagement in grooves provided in the valve body. The annular rib about the orifice accommodates dimensional variation in the valve parts to ensure a rotary sliding seal on the rotary valve member.

9 Claims, 2 Drawing Sheets

FACE SEAL FOR BARREL TYPE WATER VALVE

BACKGROUND OF THE INVENTION

The present invention relates to seals for valves and particularly to seals for a valve having a rotatable valving member which controls flow in a valving chamber between an inlet and an outlet in response to rotation of the valving member. Valves of this type have proven to be generally relatively low in manufacturing costs and particularly suitable for controlling flow of hot water to a passenger compartment heater core in motor vehicles. Heretofore, such heater core valves have been provided with a rotatable butterfly or throttle plate type valving member which has been manually actuated; and, more recently, moved by a servo actuator such as a vacuum motor or electric servo motor. However, butterfly type water valves provide nearly full flow when the butterfly plate is rotated from a closed position to only about one-fourth of its fully open position; and, therefore accurate flow control by the servo actuator is quite difficult to achieve.

With the advent of microcomputer based electronic controllers, it has been desired to provide an all electrical control system for motor vehicle passenger compartment climate control systems. Where the vehicle passenger compartment climate control system utilizes stacked cores, i.e., has the heater core and the passenger compartment air conditioner heat exchanger or evaporator disposed fluidically in series in the blower air discharge plenum, it has become necessary to provide linear response for the valve controlling flow of hot water (engine coolant) to the heater core in order for the system controller to operate the system without executing extremes of heating and cooling to regulate cabin temperature. Thus, it has been desired to provide a heater core valve which provides nearly linear flow or proportional flow control with respect to movement of the valve member. Furthermore, in order to minimize the operating force required to move the valve member, particularly where the valve is to be electrically operated, it has been desired to employ a rotary valve. It has therefore been desired to provide a rotary valving mechanism which provides nearly proportional control of the flow with respect to rotation of the valving member.

It has been proposed to use a barrel or rotary spool type valve which is transversely or cross ported to control the flow between a valve inlet port and a valve outlet port provided in the valving chamber. However, problems have been encountered in designing and manufacturing such a rotary barrel type water valve inasmuch as providing a rotary sliding or face seal about the cross port with respect to the valving chamber has proven extremely difficult and has resulted in a relatively low number of cycles or operations in the service life of a heater core water valve. Tolerances in manufacturing have created a wide variation in the percentage of compression of the seal required to maintain sealing integrity; and, problems of foundry core sand from the engine water jacket passages have caused seal scoring and leakage of the seal. In numerous cases this has resulted in the inability to shut off flow to the passenger department heater core and effectively disabling of the cooling mode of system operation. This has been particularly troublesome where the heater core is fluidically in tandem or series with the air conditioning system refrigerant evaporator coil provided in the forced air plenum of the vehicle passenger compartment climate control system.

Heretofore, known barrel type rotary water valves as shown in FIG. 1 have employed a face seal formed of resilient sealing material such as elastomer having a curved face 1 configured to conform to the surface of the rotary valving member; and, on the opposite or face 2 configured to seal about the rim of one of the valve port. A tubular extension 3 is provided from the inner periphery of the seal, which extension inserted into the valve port 4 in the valve body 5 for locating the seal thereabout. This arrangement has proven to be relatively costly in manufacturing the seal and difficult to assemble in mass production for the water valve. Furthermore, the variation in seal dimensions resulting from molding operations for the seal has proven excessive with the result that a widely varying amount of seal compression has occurred in the valves in mass production; and, leakage and sealing problems have resulted.

Thus, it has long been desired to provide a face seal for a rotary valve which is low in manufacturing costs and can accommodate a wide variation of valve port dimensions and provides a consistent and satisfactory amount of compression of the seal during valve assembly without requiring special operations or tooling for valve assembly.

BRIEF SUMMARY OF THE INVENTION

The present invention provides a face seal for a rotary barrel type valve, particularly suitable for controlling flow of hot water to a vehicle passenger compartment heater core. The seal is formed of resiliently compressible material with an arcuate configuration having a concave inner face with a rib formed about the flow passage passing through the seal to the convex outer face. The seal is preferably formed in a rectangular plan form with oppositely disposed spaced parallel edges which have flanges formed thereon which facilitate sliding assembly and retention in a valve body grooved to receive the seals. The rib formed about the flow passage on the inner face of the seal member provides adequate material to ensure a sufficient amount of localized compression of the seal between the rotary valving member and the valve body upon assembly in the valve so as to provide reliable sealing during movement of the valve member and thereby minimizes the occurrence of leakage.

DETAILED DESCRIPTION OF THE INVENTION

Figure 3:
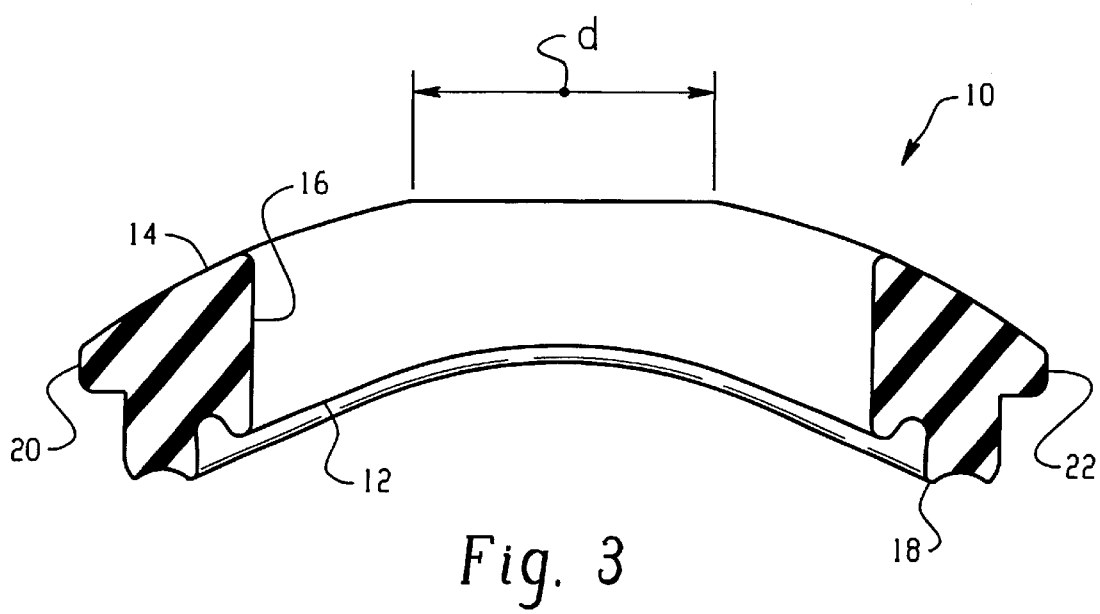
FIG. 3 is a cross-section taken along section indicating lines 3—3 of FIG. 2; and, FIG. 4 is a cross-section of a rotary valve employing the seal of the present invention.
Figure 1:
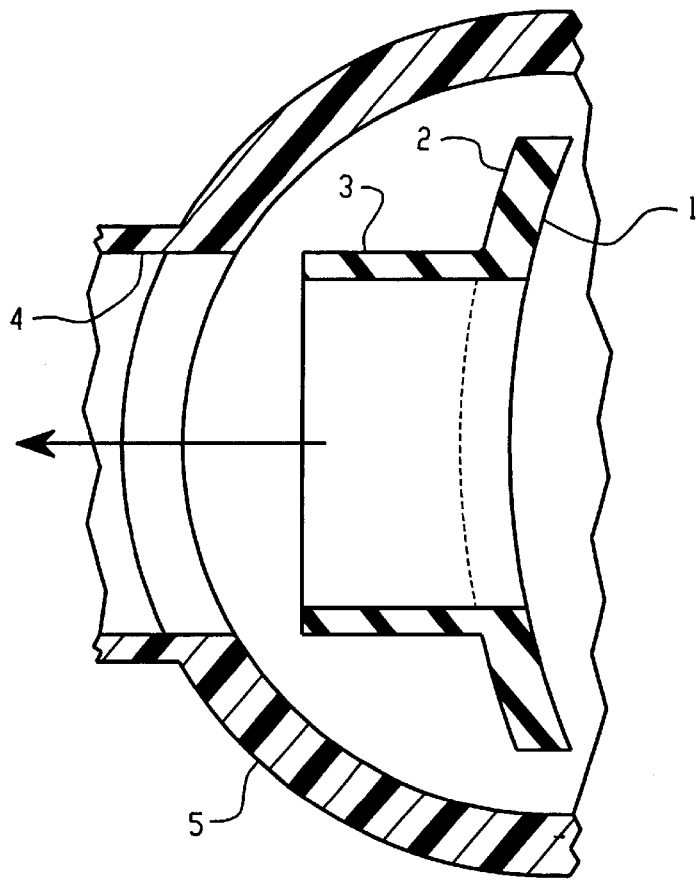
FIG. 1 is a cross-section of a valve body showing the face seal assembly for the rotary valve member as embodied in the prior art.
Figure 2:
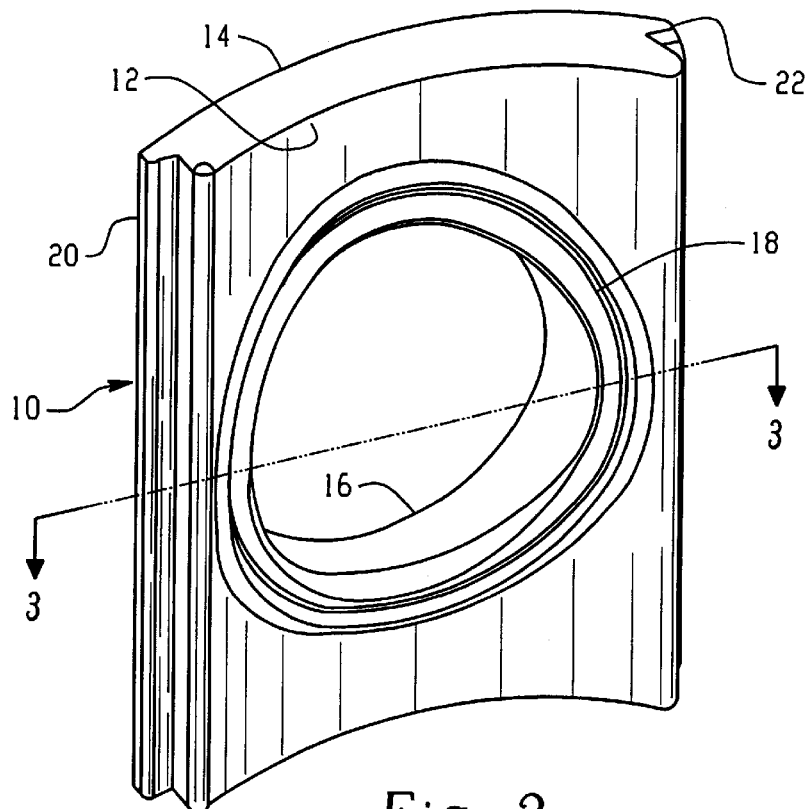
FIG. 2 is an axonometric or perspective view of the face seal of the present invention.

Referring to FIGS. 2 and 3, the seal of the present invention is indicated generally at 10 and has an arcuate configuration when viewed edgewise with a concave inner face 12 and a convex outer face 14 disposed in spaced parallel arrangement with the inner face; and, seal 10 has a generally rectangular plan form when viewed in a direction normal to the inner face 12 as illustrated in FIG. 2. A flow passage or aperture 16 is formed through the seal 10 from the inner face to the outer face, which aperture has an annular rib 18 formed therearound and which extends radially inwardly inner face 12 to provide a sealing rim about the aperture 16 on the inner face of the seal. In the present practice of the invention, the rib 18 is configured to extend radially inwardly from inner face 12 by an amount sufficient to provide adequate compression of the rib 18 in a radial direction upon assembly with the rotary valving member (see FIG. 4) in the valve body 30; and, rib 18 is dimensioned to provide the desired amount of radial compression irrespective of the variance of the dimensions of the valving chamber and valving member permissible within the allowable manufacturing tolerances of the individual ports.

The central region of the outer convex face 14 of the seal has a reduced thickness portion formed by a flattened surface extending through a chordal distance denoted by the reference character "d" in FIG. 3. The portion of the seal within the distance d thus has increased flexibility in the radial direction and may be deformed more readily upon assembly of the seal in the valving chamber structure of a valve body denoted generally at 30 and thereby permits relief of the seal member in the central region to accommodate some compression in a circumferential direction as will hereinafter be described.

Figure 4:
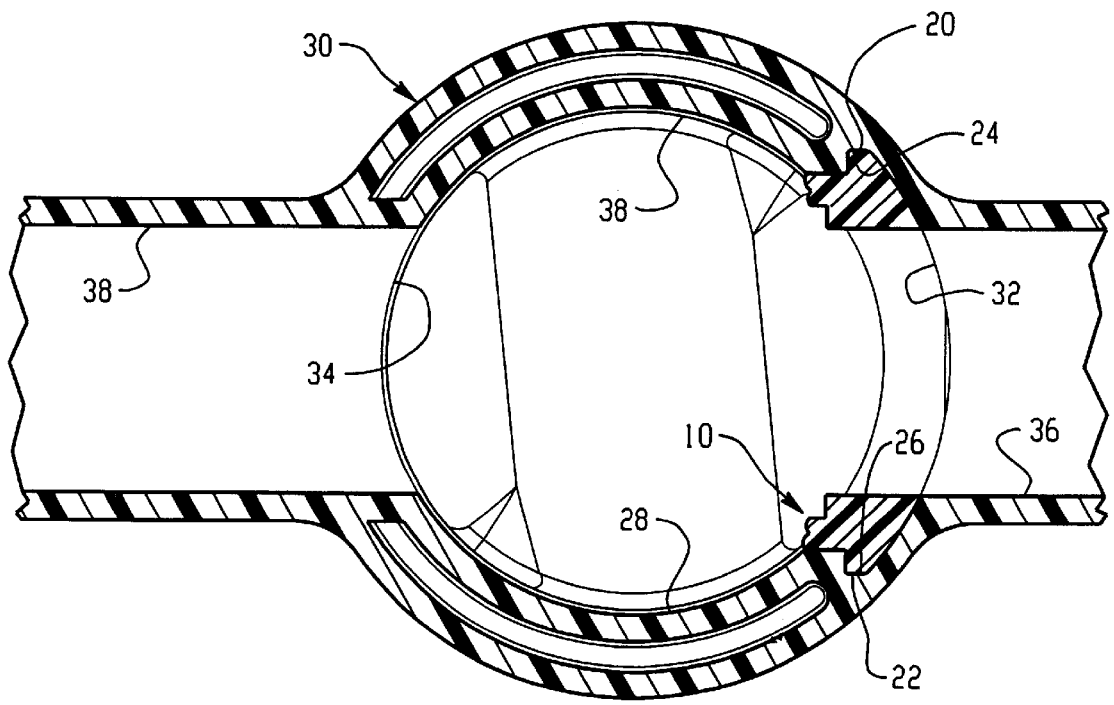

The circumferentially opposite sides or edges of the seal have provided thereon a flange or axially extending rib denoted respectively by reference numerals 20, 22 which serve to engage correspondingly configured spaced parallel grooves provided in the valving chamber structure of the body of the valve as denoted respectively by reference numerals 24, 26 in FIG. 4.

Referring to FIGS. 2 and 4, the seal 10 is configured to be inserted in an axial direction in a bore 28 formed in valve body 30 with respectively inlet and outlet ports 32, 34 formed in the valve body and which communicate respectively with inlet and outlet passages 36, 38. A cross ported barrel type rotary valving member 38 is disposed in the bore 28 and rotatable therein with the outer surface of the barrel 38 sealing against the annular rib 18 to as to permit control of flow between ports 32 and 34.

It will be understood that upon insertion of the seal into the grooves 24, 26 a slight amount of circumferential compression is provided to secure the seal firmly in the valve body; and, this is accommodated by the reduced thickness portion of the seal in the central region as described above with regard to the chordal distanced. In the presently preferred practice of the invention, the seal has a radial thickness nominally of about 3.8 mm and the rib 18 extends radially inwardly from the inner face 12 by an amount of about 0.6 mm. It will be understood however, that the dimensions of the seal may be varied to accommodate the configuration of the valve body in which the seal is employed. The face seal is formed of elastomeric material, and in the present practice ethylene propylenedimonomer (EPDM) material has been found particularly satisfactory; however, it will be understood that other suitable resiliently flexible sealing materials may be employed if desired, such as wax impregnated EPDM or elastomeric material having a relatively thin coating of polytetrafluoroethylene (PTFE) material.

The present invention thus provides a relatively low cost, easy to install and reliable face seal for a rotary valve, particularly a barrel type rotary valve and has found particular application in motor vehicle passenger compartment heater core water valves.

Although the invention has hereinabove been described with respect to the illustrated embodiments, it will be understood that the invention is capable of modification and variation and is limited only by the following claims.

What is claimed is:

1. A face seal for a rotary valve comprising: a unitary member of resiliently flexible material having a generally partial cylindrical configuration with an aperture therethrough, with a pair of spaced generally parallel margins and generally parallel radially inner and outer faces, said aperture having a rib formed therearound on said radially inner face, wherein said parallel margins includes surfaces adapted for axial sliding engagement with corresponding portions of a valving chamber and wherein said rib is adapted for compression and sliding sealing on a rotary valve member.

2. The seal defined in claim 1, wherein said parallel margins each include a an axially extending rib therein for sliding engagement in correspondingly configured surfaces in a valve body.

3. The seal defined in claim 1, wherein said unitary member is formed of elastomeric material.

4. The seal defined in claim 1, wherein said unitary member is formed of ethylene propylenedimonomer (EPDM) material.

5. The seal defined in claim 1, wherein said unitary member is formed of wax impregnated EPDM material.

6. The seal defined in claim 1, wherein said unitary member is formed of elastomeric material having a relatively thin coating of polytetrafluoroethylene (PTFE).

7. The seal defined in claim 1, wherein said partial cylindrical shape has a portion thereof with a reduced thickness between said inner and outer faces.

8. The seal defined in claim 1, wherein said unitary member has a portion thereof equidistant from said parallel margins configured for increased flexibility.

9. The seal defined in claim 1, wherein said rib has an annular groove formed therein for forming a double lip sealing surface about said aperture.

* * * * *